United States Patent [19]

Vik

[11] 3,710,823
[45] Jan. 16, 1973

[54] HYDRAULIC COUPLER WITH CAM ACTUATOR

[75] Inventor: Albam M. Vik, Brighton, Minn.

[73] Assignee: Dempco, Inc., Minneapolis, Minn.

[22] Filed: Jan. 25, 1971

[21] Appl. No.: 109,336

[52] U.S. Cl...............137/594, 285/1, 285/137 R, 285/316, 137/614.06
[51] Int. Cl..............................F16k 11/10
[58] Field of Search.............285/1, 137 R, 277, 317; 251/263, 340; 137/614.04, 614.05, 614.06, 594, 596

[56] References Cited

UNITED STATES PATENTS

| 3,301,272 | 1/1967 | Pettyjohn et al. | 137/614.06 |
| 453,012 | 5/1891 | Lonergan | 251/340 |
| 2,638,915 | 5/1953 | Mitchell | 137/614.04 X |
| 2,706,646 | 4/1955 | Olson | 137/614.04 |
| 2,837,749 | 6/1958 | Gross | 137/614.04 X |

FOREIGN PATENTS OR APPLICATIONS

| 1,020,928 | 2/1966 | Great Britain | 137/614.04 |

Primary Examiner—Henry T. Klinksiek
Attorney—Dugger, Peterson, Johnson & Westman

[57] ABSTRACT

A directly operable cam actuated hydraulic coupler with which permits closing off flow through the couplers so that they can be isolated from any hydraulic pressure present on the lines during coupling or decoupling operation, and which also permits closing off the flow even when the couplers are still coupled together physically.

10 Claims, 6 Drawing Figures

PATENTED JAN 16 1973 3,710,823

INVENTOR.
ALBAM M. VIK
BY
Dugger, Peterson, Johnson & Westman
ATTORNEYS

INVENTOR.
ALBAM M. VIK

HYDRAULIC COUPLER WITH CAM ACTUATOR

BACKGROUND OF THE INVENTION

1. Field of the Invention

The present invention is in relation to quick disconnect hydraulic line couplers.

2. Prior Art

Many hydraulic couplers in the past have included quick disconnect features and some have even included shut off valves. For example, U.S. Pat. No. 2,675,829 shows a quick disconnect coupling made with a selectively operated operable shut off valve. Other couplers of this general type are shown in the U.S. Pat. No. 2,675,829, U.S. Pat. No. 3,129,919 and U.S. Pat. No. 2,625,410.

Further, a hydraulic coupler which has a shut off feature is shown in my own copending application Ser. No. 35,444, filed May 7, 1970 for UNIQUE HYDRAULIC COUPLER.

SUMMARY OF THE INVENTION

The present invention has relation to a hydraulic coupler which uses a cam actuator that can be used for moving the coupler portions to a position wherein the fluid flow through the couplers is shut off while the coupler parts remain mechanically connected. In the "off" position the coupler members or selections can be connected or disconnected easily regardless of pressure in either or both of the lines connected to the sections. There is no need to overcome the force of the hydraulic pressure in the lines for connecting as is common in ordinary hydraulic couplers.

The cam is an external cam that is easily made, and does not require precise machining.

It is therefore an object of the present invention to present a hydraulic coupler that can be shut off to prevent flow through the portions of the coupler.

It is a further object of the present invention to present a hydraulic coupler that is easy to operate, low cost to manufacture, and does not require complex machined parts.

It is a still further object of the present invention which to present a hydraulic coupler that permits coupling and uncoupling the couplers readily even if there is pressure in the hydraulic lines being coupled.

Other objects will be apparent as the description proceeds.

DESCRIPTION OF THE PREFERRED EMBODIMENTS

Figure 1:
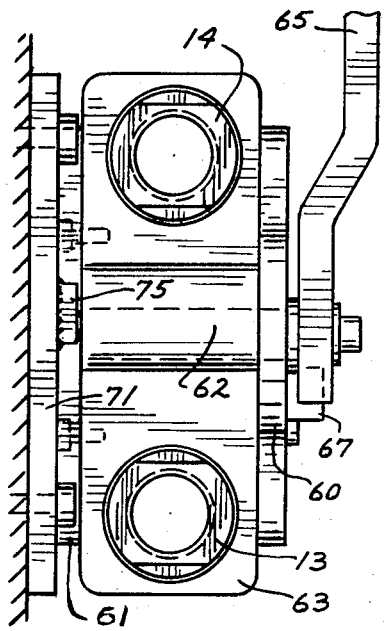
FIG. 1 is a end elevational view of a pair of hydraulic couplers made according to the present invention.
Figure 2:
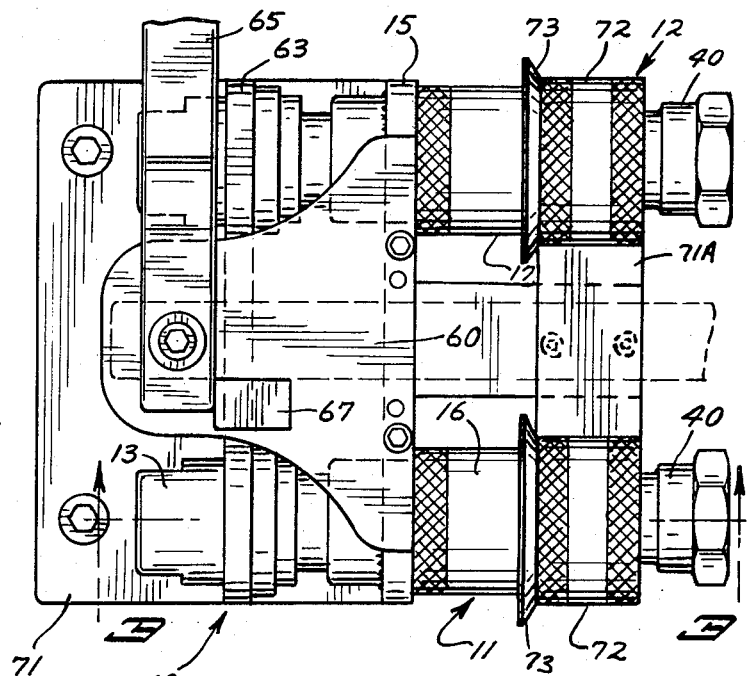
FIG. 2 is a top plan view of the device in FIG. 1.

First, referring to the form of the invention shown in FIGS. 1–4, a hydraulic coupling device illustrated generally at 10 is shown utilizing a pair of individual couplers 11 and 12, which are mounted in an assembly so that one of the couplers, for example coupler 11 can be used for pressure from a pressure source (not shown) to a remote line. Fluid under pressure comes through a conduit at the inlet end 13 of this coupler, and would then be fed to a remote hydraulic cylinder or other equipment such as a hydraulic motor. A fluid return line is attached to a removable nipple to the coupler 12 and through a return hose attached to the end 14 of this coupler and then to the reservoir. Of course a suitable control valve would be coupled onto the ends 13 and 14 for controlling the flow of fluid through these couplers. The couplers 11 and 12 are identically constructed, and are mounted together with a cross frame member 15 that is welded to outer bodies 16 and 17 respectively, of the couplers and which extends between the coupler bodies. The coupler bodies are typically shown in FIG. 3.

Figure 3:
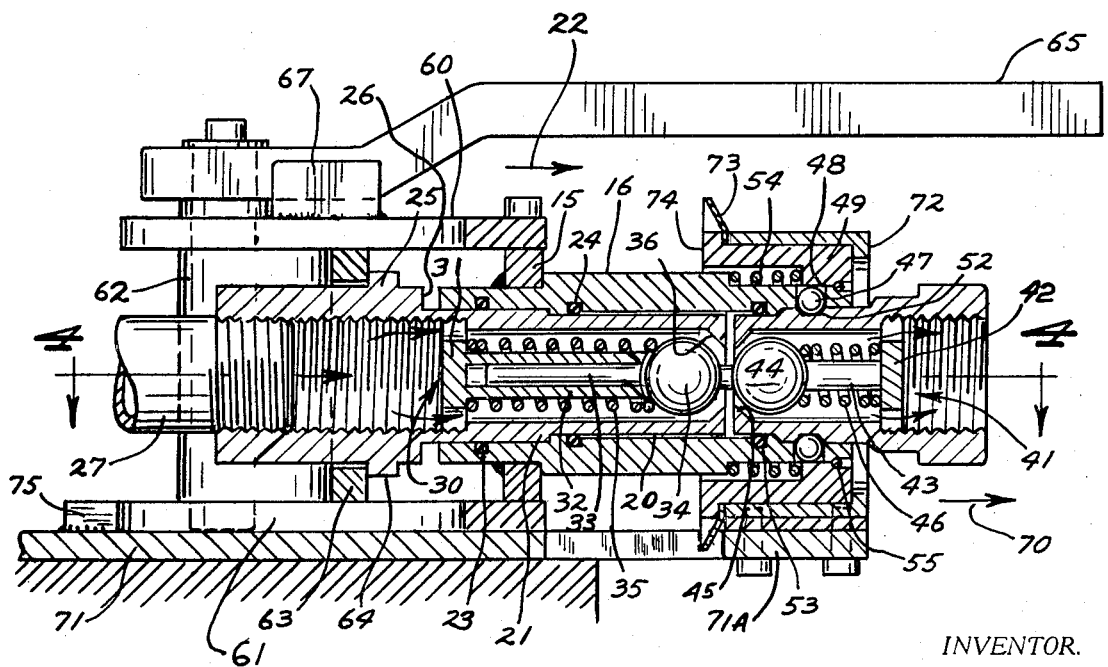
FIG. 3 is a sectional view taken as on line 3—3 in FIG. 2.

As shown in FIG. 3, the coupler body 16 of coupler 11, which is identically constructed to the coupler 12, is a tubular member having an interior chamber 20, and is of size to receive a first nipple 21 on the interior adjacent one end thereof. The nipple 21 has a mating external shoulder to limit movement toward the opposite end of the tubular member. A first O-ring 24 is utilized for sealing on the end of the nipple, and second O-ring 23 acts as a dust seal adjacent the outer end of the body 16. The cross frame member 15 is positioned against a shoulder on the outer surface of the outer bodies of the couplers. The nipples 21 on both the couplers 11 and 12 are slidably mounted for movement in direction along the longitudinal axis of the bore or chamber 20 and form movable valve body members. The end portion of nipple 21 is enlarged to permit internal threading and also to give a larger bearing area for sliding movement of the nipple, and to resist side loads from a cam which will be explained later.

As shown, the nipple 21 has an elongated outer end member 25 that has a shoulder 26 on the outer pheriphery thereof, and the end member 25 is internally threaded to receive a hydraulic hose 27 coming from a suitable control valve for actuating the hydraulic controls. The interior threads are also used for threadably mounting a headed stud 30 that has a head member 31 that threads into the interior threads of the nipple, and has a sleeve 32 extending outwardly from the head toward the internal end of the nipple. The head or stud 30 is provided with passageways on flutes at the outer edges thereof to permit fluid to pass through the interior of the nipple. The sleeve 32 has a central member that is of size to receive a shank 33 attached to a ball valve 34. The shank 33 is slidably mounted in the sleeve 32, and the spherical ball valve is positioned so that it is urged by a spring 35 that surrounds the sleeve 32 toward an annular valve seat 36 formed on the interior of the nipple. The ball valve 34 has a short projection 37 extending outwardly therefrom through the opening defined by the valve seat 36.

At the opposite end of the body 16 from nipple 21 there is mounted a standard quick coupling hydraulic nipple 40. The nipple 40 has interior threads that permit a remote hydraulic hose to be connected in if desired. A stud 41 has a head member 42 threaded into the interior of nipple 40. The stud 41 has a shank 43 that is used for stopping a ball valve 44 in proper position so that the ball valve will not move away from its valve seat 45 more than a preselected amount. The nipple thus is a ball check valve assembly. A spring 46 urges the ball 40 toward its seat 45.

The nipple 40 is held in place in the body 16 through the use of lock balls 47 that are positioned in openings 48 in the outer wall of the body 16 adjacent the end thereof, and which, when held with a locking sleeve 49 will extend inwardly through the wall of body and will engage partially an external groove 52 on the outer pheriphery of the nipple 40. The balls hold the nipple 40 in proper position inside the tubular body 16. An O-ring 53 is also used for sealing the nipple 40 in the usual manner. The locking sleeve 49 is shown in slidably mounted over the outer surface of the body 16, and is urged outwardly in direction that is indicated by the arrow 22 by a spring 54 that operates against a shoulder defined in the outer body 16, and against an internal shoulder on the sleeve 49. A snap ring 55 retains the sleeve on the body 16 and the snap ring is of course removable for disassembly and assembly purposes.

The position of the nipple 21 (which is a movable valve body with respect to the body 16) is controlled in this instance by a cam assembly. The cross frame member 15 mounts a pair of top and bottom plates 60 and 61, respectively, that are spaced apart as shown, and are used for rotatably mounting a cam assembly indicated at 62. The cam assembly has end portions that are rotatably mounted in the plates 60 and 61, and an eccentric cam member between the plates which acts against an actuator cam follower plate 63. The cam follower plate 63 is slidably mounted over the end portions 25 of the nipples 21 of both of the couplers 11 and 12, and the plate engages annular flanges 64 on these end portions. The cam is centrally located between the couplers 11 and 12 as shown, and the cam acts against the actuator plate member 63, through the flanges 64 to move the nipples 21 inwardly or outwardly with respect to the respective coupler bodies 16 and 17 depending on the position of the cam. As shown in FIG. 3, the cam is in its full "on" position and the nipples 21 in both couplers are all the way in. The cam is controlled with a control lever 65 that is mounted onto the cam, and in its "on" position as shown in FIG. 3 rests against a stop 67. When the cam is rotated 90° from the position as shown in FIG. 3, (this 90° position is shown in solid lines in FIG. 2), the lever will move the cam so that the actuator plate 63 moves rearwardly, to position as shown in FIG. 4.

It can be seen that in the "cam on" position shown in FIG. 3 the nipple 21 is moved toward the nipple 40 so that the projection 37 engages the ball valve 44 and pushes the valve 44 off its seat 45 to open a fluid passageway through the interior of the nipple 40. Full movement by the cam of the nipple 21 causes the ball 44 to rest against the end of the shank 43, and then the ball 34 will be moved away from its seat 36 to open a fluid passageway from the hose 27 into the nipple 40 and thus to any remote hoses that may be connected to the nipples 40. The spring 35 is made heavier, or of a higher rate than spring 46.

Figure 4:
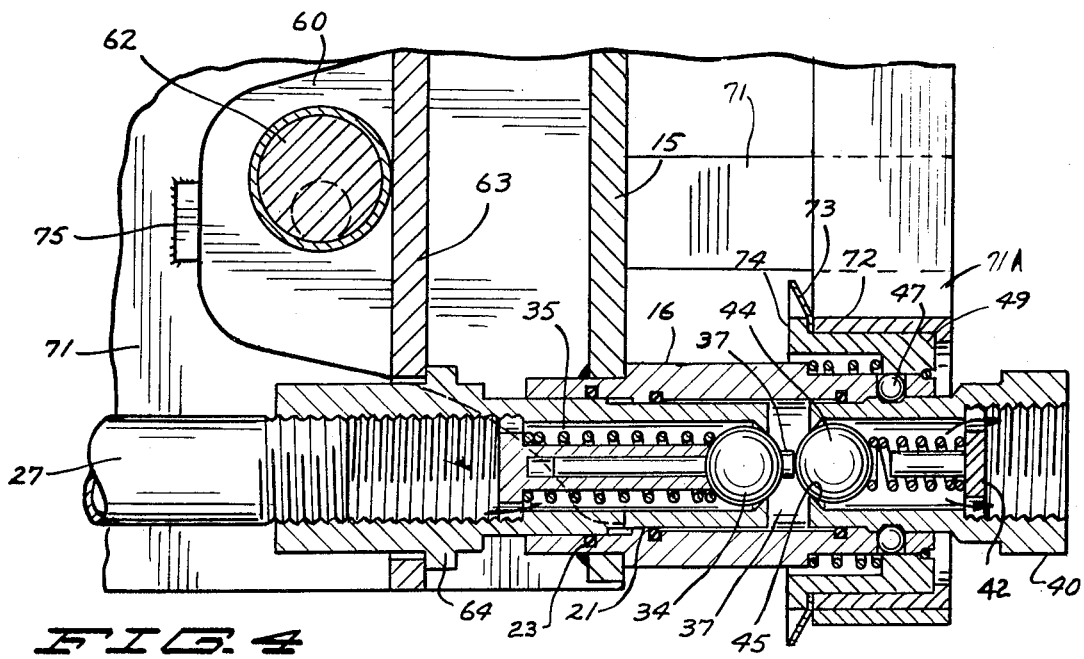
FIG. 4 is a sectional view taken as on line 4—4 in FIG. 3.

When the cam is in its "off" position as shown in FIG. 4, nipple 21 is urged by the spring 54 to back away from nipple 40 so that the projection 37 is not bearing against the ball 44, and the ball 44 will move against the seat 45. The ball valve 34 also moves against its seat 36 to close off any hydraulic flow either in or out of the coupled lines.

Thus by merely moving the lever 65 to its proper position, the couplers 11 and 12 can simultaneously be turned on or closed off. This will permit decoupling under pressure merely by turning the cam to its off position as shown in FIG. 4 using the valves 34 and 44 to close off the respective nipples in both of the couplers simultaneously.

In addition, means are provided for disconnecting when the unit is under pulling loads on the remote hoses from nipples 40. It is noted of course that sliding the lock sleeve 49 against the action spring 54 will release the balls 47 so they can move outwardly in their openings to permit the nipple 40 to escape. A mounting bracket 71 is provided, and this is fixed on to support such as a tractor, or the prime mover with which remote implements are being used. When a remote implement unhooks the tractor keeps moving, and a pulling force on the nipples 40 occurs in direction of arrow 70. The mounting bracket 71 comprises a member that holds the couplers 11 and 12 together. The plate 61 is slidably mounted over this fixed member 71. As shown, an outer cup 72 is fixedly attached by welding or with suitable cap screws, for example, to each end of a cross bar 71A which is attached to member 71, and the cups 72 fits over the sleeves 49. A separate dished washer member 73 is positioned between the inner end of each of the cups 72 and a end small flange 74 on each of the sleeves 49. The entire coupler assembly including the cam and the frame 15 is retained by the cups 72 and rests on and can slide relative to the support 71. A stop member 75 fixed to support member 71 engages plate 61 and acts to retain the coupler assembly in the cup 72 during operation while still permitting the sliding action of the coupler assembly. When a remote implement or the like becomes unhooked so that there is a pull on the hoses connected to the nipples 40, the entire coupler assembly will slide in direction as indicated by arrow 70. The cup members 72 and lock rings 49 remain stationary with respect to the support member 71 so the coupler bodies slide with respect to the lock rings.

Once the coupler assembly has slid sufficiently far then the lock rings release the lock balls and the nipples 40 will be released. Then the valves all close and an automatic break away has occurred. The springs 54 will then return the unit to its normal position against stop 75 and upon recoupling, the lock sleeves 49 can be individually slipped rearwardly by using the washer 73 which is pushed against the sleeves 49 permitting the nipples 40 again be slid into place as the lock balls 47 will be permitted to move outwardly in their openings. The stop 75 prevents the coupler assembly from sliding out of the cups 72 when the washers are pushed for recoupling.

Before recoupling the cam may be turned to its off position so that it is not necessary to recouple under pressure. In other words the recoupling can be done when the cam is in its position as shown in FIG. 4 so that the ball valves will stay closed even after recoupling. Then, by operating the cam lever 65 to the cam on position the nipples 21 will be moved axially in their respective coupler bodies. The projection 37 acts against the ball valves 44 until the unit is in its position as shown in FIG. 3 and again the valves are open.

The projections 37 on the valve members 34 permit the opening of both of the valves in the mating nipples for 21 and 40 full flow even though there may be some wear in the unit that would keep or space the nipples 40 and 21 farther apart than normal with the cam "on." As can be seen, the projection 37 will force the ball 44 open against its seat on stud 43. Full flow is achieved even if wear or manufacturing tolerances cause the nipples to be spaced, because the valve 34 is sufficiently far off its seat to permit full flow. As wear occurs, the ball 34 can move closer toward the seat 36, and still not impede the flow of fluid through the two nipples when the cam is in its open position. As stated previously the spring 35 is made to be stronger than the spring 46 so that the ball 44 will always be pushed to its full open position. The seat for the ball 44 on the shank 43 holds ball 44.

Figure 5:
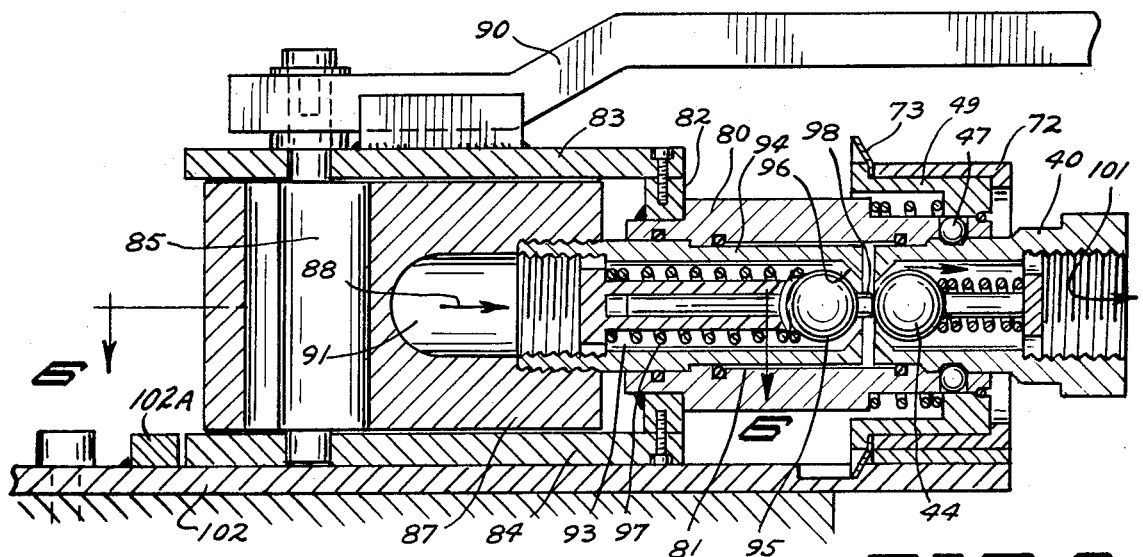
FIG. 5 is a vertical sectional view in modified form of the invention wherein a single coupler for a single hydraulic line utilizes the cam shut off principles of the present invention.
Figure 6:
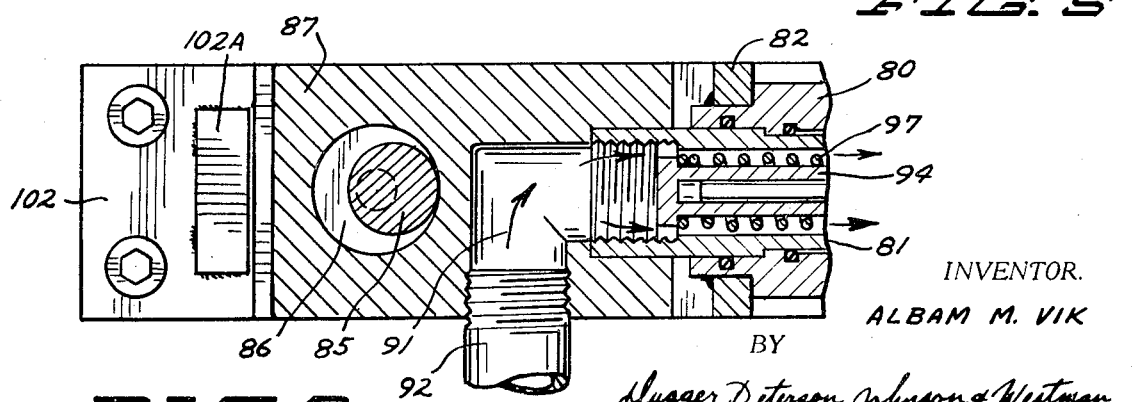
FIG. 6 is a sectional view taken as on line 6—6 in FIG. 5.

In FIGS. 5 and 6, a modification of the present invention is shown. This unit is made so that the same type of cam control for turning off or turning on flow under pressure can be used for only single couplers utilized.

As shown, the coupler body 80 has the same type of connections at the outer end for the nipple 40 as previously shown, and the lock sleeves are identically numbered. However, the nipple 21 is replaced with a nipple 81.

The coupler body 80 has a frame 82 mounted thereon, and the frame 82 supports top and bottom plates 83 and 84 respectively. These plates rotatably mount a cam member 85, which extends therebetween, and passes through an opening 86 in a sliding block 87 and is positioned between the plates 83 and 84. The block is controlled for sliding movement between the plates 83 and 84 in direction as indicated by the arrow 88, with the cam 85. A control lever 90 is used with the cam.

The block 87 has a right angle passageway 91 defined therein, and a hydraulic hose 92 is threaded into the side passageway. The nipple 81 is threaded into the longitudinal portion of the angled passageway 91.

As shown, the interior of the nipple 81 is threaded just as the nipple 21, and this mounts a sleeve member 93 that is the same as sleeve member 32, and has a sleeve 94 extending into the interior of the nipple 81. A valve 95, corresponding to the valve 34, is slidably mounted in the sleeve and urged toward a valve seat 96 with a spring 97. The valve 95 has a projection 98 thereon just the same as the projection 37 in the previous form of the invention.

In this particular instance, by controlling the valve cam 85, the nipple 81 can be moved toward or away from the nipple 40 that is positioned and constructed just as in the previous form of the invention. This will permit moving the unit to its on position as shown in FIG. 5, or by moving the cam 90° to its off position which would move the nipple 81 away from the end of nipple 40 and cause the ball valve 95, and the ball valve 44 of the nipple 40 to both close.

For automatic decoupling when a pull is exerted on a remote hose in direction that is indicated by the arrow 101, the cup 72 is again utilized, in this case the cup 72 is fixedly mounted onto a support member 102 which is only the width of the single coupler utilized, and which can be fastened onto a tractor or the like. The coupler assembly lock sleeve 49 is placed inside the cup 72 as in the previous form of the invention and it is retained in the cup, and the assembly is also supported on top of support member 102 for sliding movement. A stop 102A fixed to the top of support member 102 prevents the coupler assembly from moving out of the cup 72. This acts in the same way as cup 72 and the stop 75 in the previous form of the invention. The cup 72 and the stop 102A hold the member 80 with respect to the support 102 through the sleeve 49 and cup 72. Support member 102 slidably supports the plate 84 and the assembly so that pull on the nipple 40 will cause the entire body 80 to slide in the direction as indicated by arrow 101 releasing the lock balls 47 so that the nipple 40 can be released. The washer 73 is again used when recoupling the unit, and it is to be remembered that the lever 90 can be rotated 90° to pull this nipple 81 away from its position as shown in FIG. 5 so that the unit can be closed off during the coupling operation and the unit does not have to be coupled under pressure. For manual decoupling, likewise, the unit does not have to be decoupled under pressure because the cam can be closed off to shut off flow through both of the valves on both of the nipples. The support member 102 is recessed under the washer 73 to permit the washer to be slid rearwardly for releasing the unit.

The head 42 for the stud in nipple 40 is provided with openings or flutes to permit fluid to flow outwardly through the nipple 40.

The invention is usable in many differing embodiments and is to be limited only by the appended claims.

What is claimed:

1. An automatic coupling device for use in a hydraulic circuit comprising a main body member having a bore, releasable means on said main body member for releasably retaining a coupler nipple check valve assembly in position on said body member, and a movable valve body means for connection to a hydraulic line at an inlet end thereof and being slidably mounted in said bore with respect to said main body member, said movable valve body means including a valve means at one end thereof normally urged in normal direction of fluid flow toward a closed position and being movable to an open position, cam means movable to and from a first position and coupled to cause sliding of said movable body in said bore, said valve means in said movable body including means to engage portions of a coupler nipple check valve assembly mounted on said releasable means when said cam means is in said first position to restrain movement of said valve means toward a coupler nipple check valve assembly to open said valve means and said coupler nipple check valve assembly to form a fluid passageway through said movable body and said coupler nipple check valve assembly when the movable valve body means is moved to a valve open position with the cam means in said first position, said cam means being movable to a second position wherein said movable valve body means is moved to position so that the valve means is closed even when a coupler nipple check valve assembly is positioned in said releasable means, said valve means being opened only by reaction of forces against a coupler nipple check valve assembly mounted on said main body during use.

2. The combination as specified in claim 1 wherein said coupler nipple check valve assembly includes a check valve member and spring means urging said check valve member to closed position.

3. The combination as specified in claim 1 wherein said valve means includes a projection extending beyond the movable body, said projection engaging a coupler nipple check valve assembly mounted on said main body member when said cam is in its first position.

4. The combination as specified in claim 1 wherein cam means comprises a lever actuated cam member rotatable about an axis substantially perpendicular to the axis of said bore, a cam follower plate, said cam follower plate engaging said movable body and controlling movement thereof in one direction.

5. The combination as specified in claim 1 and a stop means on the interior of said movable body, said stop means preventing movement of the valve means in said movable body beyond a preselected position in direction away from its valve seat.

6. The combination as specified in claim 1 wherein a pair of said coupling devices are assembled into a coupler assembly, said coupling devices being positioned substantially parallel to each other in side by side, spaced apart relationship, said cam means including a cam follower means extending between said coupling devices on said assembly, and cam mounting means fixed with respect to the main body members of both of said coupling devices, said cam mounting means mounting said cam means substantially midway between said coupling devices, said cam means engaging said cam follower means whereby operation of said cam means causes said cam follower means to move the movable valve body means of each of said coupling devices substantially simultaneously.

7. The combination as specified in claim 1 wherein said cam means is on the exterior of said coupling device.

8. A coupling device for use in hydraulic fluid circuits comprising a body member, a fluid passage in said body member, a fluid check valve, releasable means to mount said fluid check valve at one end of said fluid passage, said fluid check valve including a valve seat and a first valve member, said first valve member being movable from a closed position to an open position upon movement in a first normal fluid flow direction through said body member, and a second valve assembly slidably mounted with respect to said body member, said second valve assembly including a valve housing having an internal chamber having an inlet and an outlet, a valve seat carried by said valve housing adjacent the outlet of said internal chamber, a second valve member which mates with said seat carried by said housing, said second valve member being movable to a closed position against said seat to shut off fluid flow through said chamber and being movable relative to its seat to an open position, and cam means mounted with respect to said main body and operable to move said valve housing and said second valve assembly with respect to said body member to a position wherein said first and second valve members react against each other and each of the valve members is moved to its respective open position, and said cam means being movable to a second position to move the valve housing away from the fluid check valve to position wherein said valve members are permitted to move to their closed positions, said second valve member normally being free to move to its closed position regardless of the cam means position whenever the releasable means releases the fluid check valve.

9. The coupling device of claim 8 wherein said fluid control valve comprises a hydraulic coupling nipple removably mounted in said body member, and said first valve member is a spring loaded check valve member, said second valve engaging said check valve member and moving it away from its seat with the cam in said first position, and means in said coupling nipple to prevent movement of said check valve member more than a preselected distance away from its seat.

10. The coupling device of claim 9 wherein said second valve member comprises a cylindrical housing, and wherein said body member has a bore therethrough defining said fluid passage, said nipple being positioned in and extending outwardly from a first end portion of said bore, and said cylindrical housing extending for sliding movement toward and away from said nipple, said housing having a portion extending to the exterior of said body member, and said cam means being positioned exteriorly of said bore.

* * * * *